Figure 1:
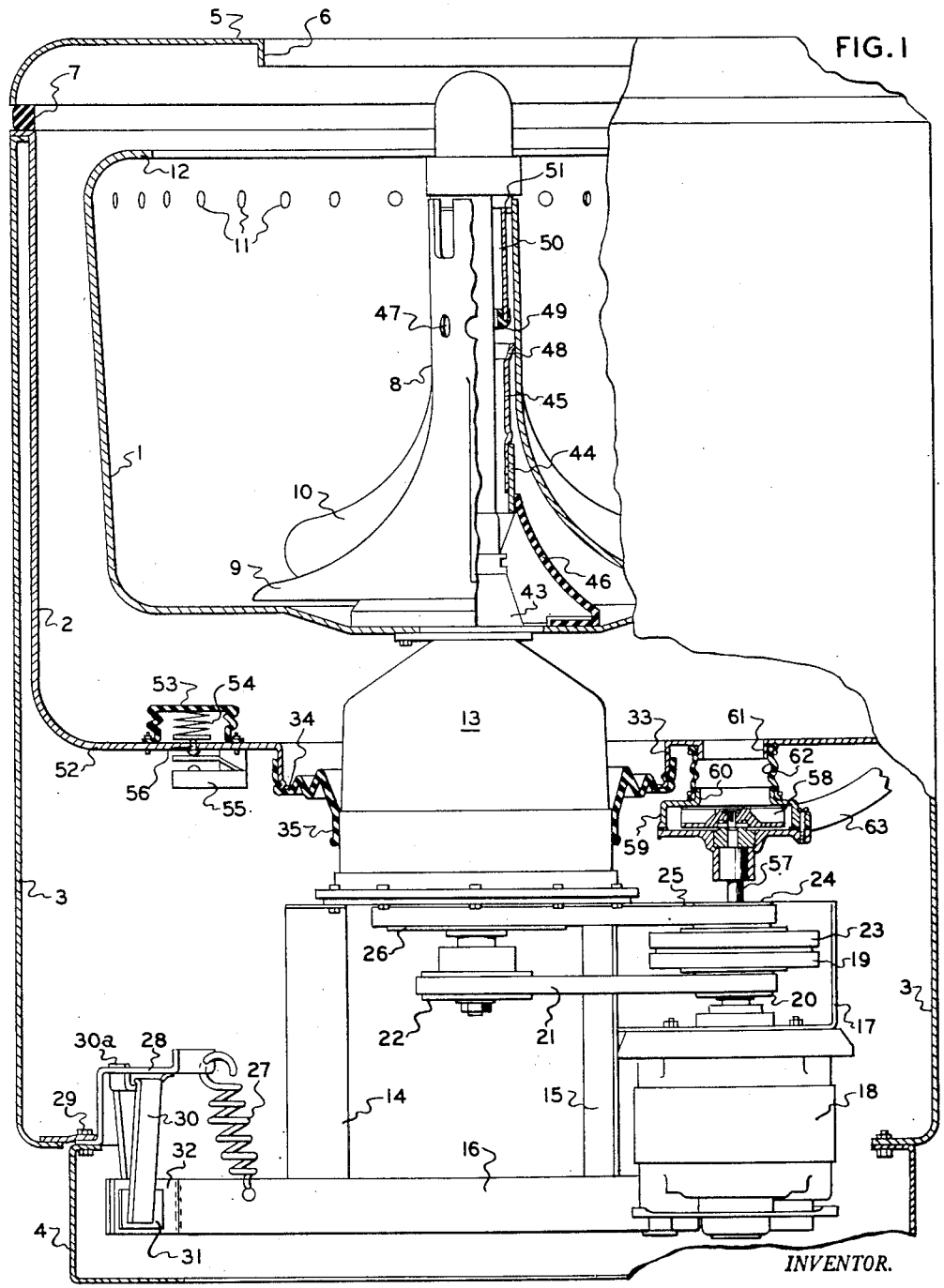

March 12, 1957     T. M. HARTUNG ET AL     2,784,582
ELECTRICAL CONTROL SYSTEM FOR AUTOMATIC WASHER
Filed March 19, 1954     2 Sheets-Sheet 1

INVENTOR.
THEODORE M. HARTUNG
& FRANCIS J. FORNESS
BY
THEIR ATTORNEY

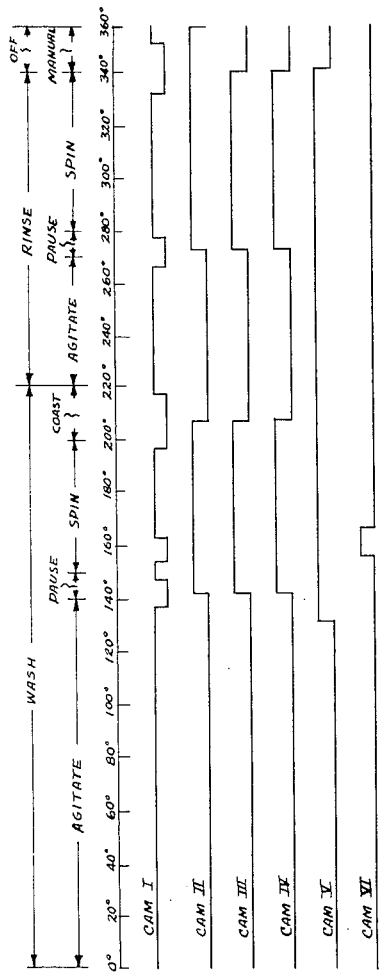
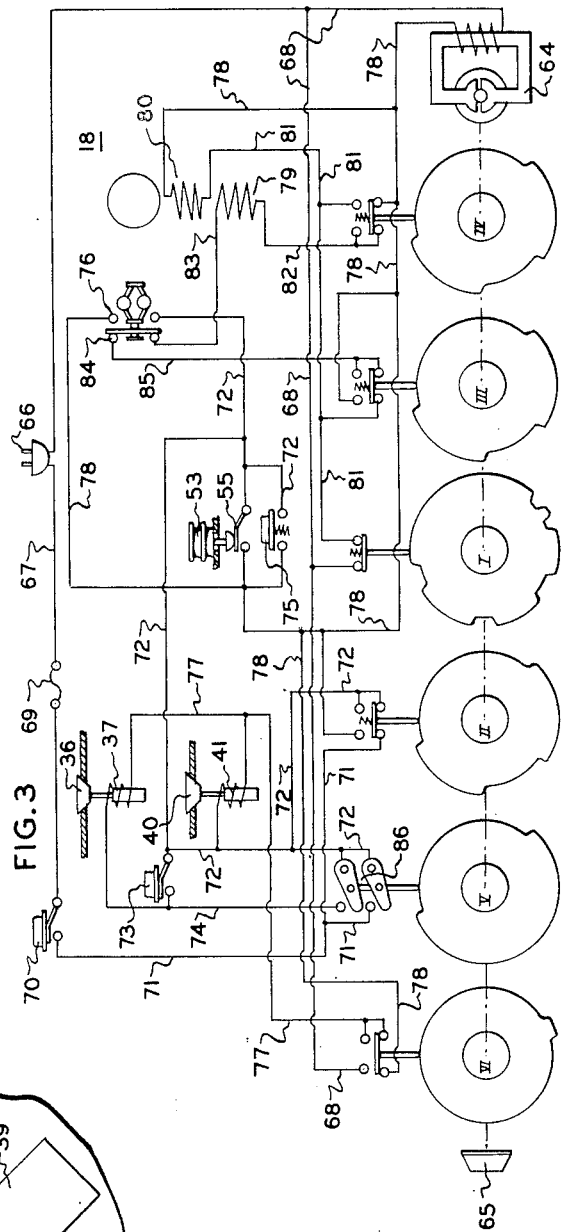
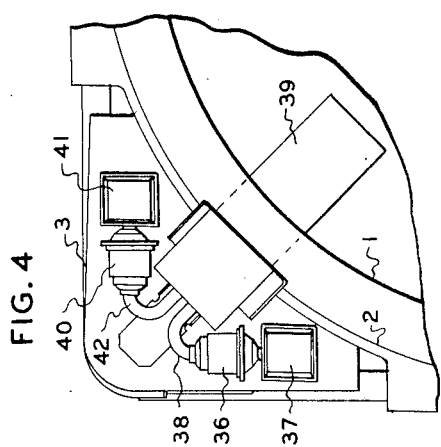

United States Patent Office 2,784,582
Patented Mar. 12, 1957

2,784,582

ELECTRICAL CONTROL SYSTEM FOR AUTOMATIC WASHER

Theodore M. Hartung, Louisville, Ky., and Francis J. Forness, Trenton, N. J., assignors to General Electric Company, a corporation of New York Application March 19, 1954, Serial No. 417,426

10 Claims. (Cl. 68—12)

This invention relates to automatic clothes washers, extractors, and dryers, and more particularly to the automatic electrical control system for such machines.

An object of this invention is to provide a clothes washer control having timed periods for the various operations of wash, rinse, and dry, in sequence; but with a liquid fill control functioning independently of the timed periods and without affecting the length thereof.

A further object of our invention is to provide, in conjunction with a clothes washer, an automatic liquid supply to the machine effective to terminate automatically the liquid filling operation responsive to the quantity of liquid supplied, regardless of the time required to fill the machine; and with manually operable means to terminate, at will, the liquid filling operation. In either event, it is an object of this invention to arrange the automatic sequence control in relation to the liquid fill control so that the washing machine operations are held in abeyance during the time required for liquid supply to the machine.

It is also an object of this invention to provide an automatic electrical control for a clothes washer and extractor of simplified construction for maximum reliability at a minimum manufacturing cost. In this connection, an important objective of the invention is to utilize standard, readily available components for the operation of the machine.

This invention is intended in particular for use in conjunction with a washing machine having an electro-responsive liquid fill means and an electric motor drive for the washing and extracting means. The liquid fill control prevents operation of the washing means during fill periods in the automatic cycle, and utilizes a liquid level responsive switch to terminate the liquid supply and energize the drive motor along with an automatic sequence control for the remaining operational periods of the complete cycle. Such an electrical control has been described and claimed in Patent No. 2,654,239, of S. B. Welch and E. G. Olthuis, issued October 6, 1953, for an "Automatic Washing Machine Electrical Control System," and assigned to the General Electric Company, assignee of this application.

A feature of this invention is the addition to the automatic control system of a manually operable switch functioning to terminate the liquid fill period and commence the washing period at the will of the operator. The invention further features the addition of a motor operated switch effective upon commencement of motor operation to continue the operational sequence of the machine, independently of liquid level in the machine whether the level be established manually or automatically.

The features of our invention which we believe to be novel are set forth with particularity in the appended claims. The invention itself, however, both as to its organization and method of operation, together with further objects and advantages thereof, may best be understood by reference to the following description taken in connection with the accompanying drawings, in which Fig. 1 is a side elevation, partially in section, through an automatic clothes washer embodying our invention; Fig. 2 is a surface development of the cams used for the automatic sequence control of a washing machine embodying our invention; Fig. 3 is a schematic wiring diagram of the operational components and the electrical connections thereto as embodied in our invention; and Fig. 4 is a partial plan view of the machine illustrated by Fig. 1, broken away to illustrate details.

Referring now to Fig. 1 of the drawing, we have shown a washing machine of the type for which our invention is particularly adapted, although not necessarily limited thereto. This particular machine includes a clothes basket 1, of generally cylindrical configuration but with slightly outwardly flared side walls, rotatably mounted within an enclosing tub 2, which in turn is supported within an outer casing 3. Outer casing 3 is supported on a base frame structure indicated generally at 4. Enclosure of the machine may be completed by a conventional cover structure 5 having an entrance aperture 6 therein providing access into basket 1. Cover 5 preferably is supported on the tub and casing structure with a suitable flexible gasket 7 therebetween.

It is to be understood that basket 1 defines the container into which a suitable charge of washing liquid, detergent, and clothes to be washed may be placed. Within the basket is an agitator 8, of the type driven with an oscillatory motion, having a downwardly depending outwardly flared skirt 9 with a plurality of upstanding vanes 10 thereon. On completion of the washing operation, basket 1 is rotated at high speed, whereupon the washing liquid is thrown outwardly through a plurality of apertures 11 adjacent the upper edge of the basket and in the portion of the basket of maximum diameter. As shown by Fig. 1, the upper edge of the basket is rolled inwardly as at 12 to define a barrier preventing flotation or projection of the clothes from basket 1 into outer tub 2.

The rotatable support of agitator 8 and basket 1 is accomplished by employment of a gear case indicated generally at 13. Rigidly connected with gear case 13 is a supporting framework including vertical braces 14, 15, a lower horizontal spider 16, and a motor supporting bracket 17. Motor 18 provides the motive power for operation of both basket 1 and agitator 8. By way of example, motor 18 may drive a bi-directional clutch structure having a lower clutch portion 19 providing, upon one direction of motor rotation, driving torque to a pulley 20 connected by belt 21 to the agitator input pulley 22. Similarly, an upper clutch portion 23 is effective upon rotation of motor 18 in the opposite direction to provide driving torque to pulley 24, which is connected by flexible belt 25 to a pulley 26 providing the drive for high speed rotation of basket 1.

While we have not disclosed herein the specific construction of the clutch structure and transmission, reference is made to the construction disclosed and claimed in the patents issued to J. W. McNairy, Nos. 2,639,618 and 2,639,794, both issued May 26, 1953, and assigned to the General Electric Company, assignee of this application.

As is well known in the art, when basket 1 is rotated at high speed, with a load of clothes therein, conditions of static and dynamic unbalance are likely, resulting in gyration of basket 1 about its rotational axis. Such gyrations result, of course, in vibrations, and to prevent transmission of such vibration to the floor upon which the machine rests, preferably the entire structure consisting of the basket, transmission and motor assembly is resiliently suspended with respect to base 4 of the machine. Such resilient constructions are also well known in the art, and by way of example, we have shown herein a spring suspension by which spider 16 is supported with respect to base structure 4. While only one spring 27 is shown by Fig. 1, it is to be understood that a plurality of such springs are employed equiangularly spaced. As shown, each spring 27 extends from spider 16 to a bracket 28 secured to base structure 4 by means of a bolt or weld 29. It is also preferable in machines of this type to provide damping for the vibrations. This may be accomplished by friction damping devices, one of which is shown in Fig. 1 as including a U-shaped spring 30 carried from a tongue 30a on bracket 28, functioning to compress friction pads 31 against an outwardly extending arm 32 of spider 16. Thus, as the resiliently suspended structure tends to move with respect to base structure 4, relative movement occurs between the friction pads 31 and the outwardly extending arm 32, thereby suppressing and damping vibrations of the moving system. In order that transmission assembly 13 may move relatively to the stationary tub 2, we provide an enlarged flanged aperture 33 in the bottom wall of tub 2, to which is clamped or otherwise secured an edge of a flexible boot 34, formed with a series of convolutions to increase its flexibility. The opposite end of the flexible boot is secured at 35 to gear case assembly 13 to provide a liquid-tight seal.

In Fig. 4, we have shown an arrangement through which water or other washing liquid may be admitted into basket 1. A cold water supply line (not shown) is connected in any suitable manner to the inlet of a cold water valve 36, which is operated between open and closed positions by a solenoid 37. Discharge from cold water valve 36 is through a conduit 38 into a suitable spout structure 39 extending radially inwardly to discharge into basket 1. Similarly a hot water line (not shown) is connected to a hot water valve 40 controlled by a solenoid 41, with hot water discharge into the same spout 39 through a conduit 42.

Domestic washing machines of this type must be constructed to operate satisfactorily under a very wide range of inlet water pressures. Consequently, it is preferred to construct the machine so that the automatic control senses the absolute quantity of water admitted, rather than controlling water inlet on a time basis. As disclosed in this particular embodiment, the overflow water from basket 1 into tub 2 is employed to actuate a liquid level responsive means. For example, the central portion of agitator 8 may be hollow to receive not only a hub 43 for basket 1, but also a sleeve 44 secured to the hub. A second sleeve 45 may be telescoped within sleeve 44, with the upper edge of sleeve 45 so positioned within the center post of agitator 8 as to define a half-load liquid level for the machine. As clearly shown by Fig. 1, a rubber boot 46 makes a sealing engagement with the lower portion of sleeve 44 and likewise a sealing connection with the bottom wall of basket 1. Thus, boot 46 in cooperation with sleeve 44 and 45 define a passageway through which overflow liquid entering the center post of the agitator through an aperture 47 may flow downwardly into outer tub 2. The upper end of sleeve 45 is bell-mouthed as at 48 to receive the lower end of a sealing gasket 49 secured to an axially movable sleeve 50 within the center post of the agitator. When sleeve 50 is moved to its lowermost position with gasket 49 in sealing engagement with mouth 48, liquid must rise to the upper flanged end 51 of the upper sleeve before overflow liquid can pass downwardly through the center post into outer tub 2. Thus, when sleeve 50 is in the down position, a full-load water level is defined for basket 1. While this full-load water level is shown as being somewhat below the level of overflow holes 11 in the basket, it is to be understood that overflow through apertures 11 likewise can be used for operation of the liquid fill control switch to be described presently.

The means sensitive to the quantity of washing liquid supplied to the machine is herein shown as embodied in a diaphragm operated switch mounted in the bottom wall 52 of the outer tub. This construction is shown by way of example only, and obviously other means such as floats and other types of water pressure or weight switches can be employed to sense the quantity of water supplied to the machine to actuate a switch. Such a control is in sharp contrast to devices operating on a time basis and which attempt to provide a constant rate of flow of liquid into the machine regardless of pressure, whereby the quantity of liquid supplied is controlled as a time function. As shown by Fig. 1, a flexible diaphragm 53 is mounted on the bottom wall 52 of the tub. Diaphragm 53 may be biased to its extended position by any suitable means such as a spring 54. Motion of diaphragm 53 under the influence of liquid in the outer tub 2 is transmitted to a switch 55 by an operator 56. Thus, it may be seen that whenever an appreciable quantity of overflow water is present in tub 2, diaphragm 53 will be compressed to actuate switch 55 to its closed position. It is to be noted, however, that we contemplate as within the scope of this invention any switch means actuated to a closed position dependent upon the quantity of water supplied to the machine.

In conjunction with motor 18, and driven thereby through a shaft extension 57, we provide a pump having a rotor 58 operating within a pump casing 59. Inlet 60 to the pump is connected with an aperture 61 in the bottom wall of tub 2 by means of a flexible connector 62. The outlet of the pump discharges through a suitable hose 63 to a point outside of the machine, for example to the waste or sewer connection. In accordance with this invention, this pump may be a standard centrifugal pump producing a positive head in discharge line 63 regardless of the direction of rotation of its rotor. In other words, it is to be noted in particular in connection with this invention that this pump effectively disposes of any liquid within tub 2 upon either direction of rotation of drive motor 18.

Referring now to Figs. 2 and 3 taken together, we have disclosed the electrical control system of our invention. In Fig. 3 are shown a plurality of cams numbered with Roman numerals I through VI, inclusive, which cams are driven electrically by a timer motor 64, or manually rotatable by a control knob 65. The diagram of Fig. 2 presents a development of the cam surfaces of cams I through VI respectively. In other words, with respect to the cam chart for any one particular cam, the lower level line represents the arc of the portion of the cam surface which is recessed, while the upper level line represents an arc on the cam surface of a larger radius. It is to be understood that one complete cycle of operations of the washing machine requires approximately one complete revolution of the cams, or 360° of travel, representing for example 36 minutes of running time.

Referring now specifically to Fig. 3, plug 66 supplies electrical power at an appropriate voltage to lines 67 and 68. In the circuit in line 67 are a current limiting fuse 69 and a manually operable line switch 70, which when closed connects a line 71 to the electrical power source. In the position of the cams shown by Fig. 3, the machine is in the beginning of the agitation cycle, for example at approximately 5° to 10° on the cam chart of Fig. 2. Therefore, during the agitation portion of the cycle, the switches are in the positions shown by Fig. 3. Circuit 71 is connected therefore to circuit 72 by means of cam operated switch II. A number of parallel circuits extend from line 72. In the first place, solenoid 41 has one of its terminals connected to line 72. Similarly, a manually operated control switch 73 is connected to line 72. This switch, which may be located at any convenient point on the washing machine, is provided whereby the operator may close the switch to provide luke warm water to the machine by connecting water valve solenoids 37 and 41 in parallel. As shown, cold water solenoid 37 has one of its terminals connected to a line 74 which is connected to line 72 through the manually operable switch 73. A third parallel circuit from line 72 is afforded through the diaphragm operated switch 55, which switch is also in parallel with a manually operable wafer saver switch identified by numeral 75. Finally a parallel circuit may be completed from line 72 through a normally open centrifugally operated switch 76. By normally open in this instance is meant that the switch is open when motor 18 is at rest, and is closed centrifugally when motor 18 comes up to its normal speed.

Returning again to the water valve solenoids 37 and 41, the respective lower end terminals illustrated by Fig. 3 are connected together to a line 77, which extends to a suds-kill switch, operated by and referred to as cam operated switch VI. Except for a very short period of time, cam operated switch VI, or the suds-kill switch, is in its lower position as shown by Fig. 3. From switch VI the circuit continues through line 78 to one terminal of the timer motor 64, and in parallel through cam operated switch IV and line 82 to the starting winding 79 of the motor, and in parallel to the main winding 80 of the motor. The opposite terminal of timer motor 64 is connected to the other side of the electrical supply line 68, while the opposite terminal of the main winding 80 of the motor is connected to supply line 68, through cam operated switch I by means of line 81. As explained in the aforementioned Welch and Olthuis Patent No. 2,654,239, the relative impedances of the water valve solenoids, the timer motor, and the main drive motor windings are such that when the circuit is through either or both of the water valve solenoids and all the motor windings, the solenoids are energized to open respective water valves, but neither of the motors obtain sufficient flow of electrical current to cause their operation. Hence, with the circuit connections as just described, and with the diaphragm actuated switch 55 open, the manual water saver switch 75 open, along with centrifugal switch 76 in an open position, water continues to flow into the machine, while the timer motor 64 and the main motor 18 remain at rest.

As explained in connection with Fig. 1, the incoming liquid through the water valves enters basket 1 until the overflow level is reached, whereupon the liquid enters outer tub 2 until sufficient pressure is reached to actuate diaphragm switch 55 to its closed position. Alternatively, the manually operable water-saver switch 75 may be closed by the operator at will to accomplish the same result. As can be seen from an examination of Fig. 3, as soon as a circuit is completed through either water sensing switch 55 or manual switch 75 from line 72 to line 78, a circuit is completed directly to the main winding 80 of motor 18, and to the start winding 79 of the motor through cam operated switch IV and line 82, so that motor operation commences.

To commence agitation, the circuit from the start winding is completed through line 83 to the normally closed centrifugal switch 84 within the motor, to line 85 leading to the cam operated switch III, in its down position as shown, to line 81, the pause switch I, and to the other side of the electrical supply line 68. Closure of either the diaphragm switch 53 or the manual water saver switch 75 also places full-line voltage on the windings of control motor 64. Correspondingly, both of the water supply valve solenoids are deenergized so that agitation of the clothes commences in a well-understood manner. It will also be recalled that operation of motor 18 results in operation of the pump to empty the liquid from tub 2, thereby allowing the diaphragm switch 55 to reopen. Also, if switch 75 is manually operated, it is assumed that the biasing spring reopens this switch as soon as pressure is released. However, as soon as motor 18 has come up to speed, normally in a very short period of time, the normally open centrifugal switch 76 is closed to complete the circuit to line 78 and supply power to both the main drive motor and the timer motor as described. In other words, a momentary operation of either the diaphragm switch or the manual water-saver switch is sufficient to commence operation of the machine, which thereupon renders the water fill control inactive through the centrifugally operated motor switch. Thereafter, timer motor 64 drives the bank of cams for the automatic sequence control of the machine. For example, these cams might be rotated at a speed of one complete revolution in 36 minutes or 10 mechanical degrees of rotation for each minute.

With the machine thus in operation following completion of the water fill period, timer 64 drives the cams in a counterclockwise direction as shown on Fig. 3. The first cam rise reached is on cam V to actuate the double-pole switch 86 to the closed position. This particular switch 86 has a dual function. In the first place, it may be noted that closure of the switch places both water valve solenoids 37 and 41 in parallel so that in the subsequent rinse-fill portion of the cycle, in the incoming rinse water is always a mixture of the hot and cold, regardless of the setting of manual switch 73. Additionally, closure of switch 86 under the influence of cam V completes an electrical circuit from line 71 to line 72, preparatory to operation of the machine in the spin portion of the cycle, during which the water-fill controls are by-passed.

The pause switch, under the control of cam I, is effective just prior to 14 minutes of elapsed time or 140° of cam rotation to enforce a pause in the operation of the machine with the exception of timer 64 which continues to run during the pause. As previously explained, the main drive motor windings complete their circuit through line 81 and the pause switch to power supply line 68. Therefore, upon any opening of cam operated switch I, the main drive motor ceases to operate. It is pointed out in this connection that the impedance of the windings of timer motor 64 exceeds the impedance of either of the solenoids for operating water valves. Therefore, when the pause switch is open a circuit to continue operation of the timer motor may be completed through either or both water valve solenoids as follows: from the power supply source through line 71, and either switch 86 or cam operated switch II to line 72, through a valve solenoid to line 77, through cam operated switch VI to line 78, to the timer motor winding, with completion of the circuit through line 68. Through this circuit, sufficient voltage is supplied across the timer motor winding to continue its operation through the pause period.

As clearly shown by the cam chart of Fig. 2, cam operated switches II, III, and IV reverse their positions during the pause period. Cam operated switch II functions to by-pass the liquid fill controls for the spin operation; while cam operated switches III and IV function to reverse the relative polarity of the start winding with respect to the main winding of motor 18. Thus, upon conclusion of the pause period under the control of cam operated switch I, motor 18 rotates in the opposite direction, whereby spin clutch 23 (Fig. 1) is effective through belt 25 to rotate the input drive pulley 26 causing transmission 13 to rotate basket 1 at a high speed for centrifugal extraction. With the pause switch closed, the circuit can be traced from the incoming electrical supply line 67 through fuse 69 and manual line switch 70 to line 71. Since switch 86 is now closed, a circuit is completed to line 72, through cam operated switch II to line 78. From line 78 one parallel path is completed through main winding 80 of the motor, while a second parallel circuit is completed through cam operated switch III, line 85, the normally closed contact of the centrifugal switch, line 83, start winding 79, line 82, cam operated switch IV, to line 81. From line 81, the circuit is completed to the other side of the electrical supply line through the pause switch, and line 68 as previously described.

As clearly shown by the cam chart of Fig. 2, a short pause is initiated soon after the beginning of the spin cycle between 150° and 160°. This pause is found desirable in order to permit the soapy water discharged from the basket to settle into the bottom of tub 2. At the same time it will be noted that cam VI operates its switch to the up position to close a circuit from supply line 67, through line 71, switch 86, lines 72 and 74, water solenoids 37 and 41, line 77, switch operated by cam VI, to line 68 forming the other side of the electrical supply. A quantity of fresh water is thus introduced into the machine to facilitate a rapid condensation of the soap suds. This portion of the cycle is commonly referred to in the art as the suds kill. It is found desirable since a quantity of soap suds surrounding basket 1 will prevent a high speed rotation thereof for centrifugal extraction.

The next point in the cycle occurs at the conclusion of the centrifugal extraction of the soapy liquid from the clothes, at which time a pause in operation of the machine is enforced to allow the rapidly rotating basket to come to rest. As shown by the cam chart, this occurs shortly before the 200° rotation point and continues for about 20° of cam rotation. During this pause period it is to be noted that cam switches II, III and IV again return to their lower position, calling for operation of motor 18 in a direction for agitation. Cam operated switch V remains in its up position, and hence as soon as the pause switch re-closes, the circuit is completed through both of the water supply valve solenoids to cause the machine to fill with warm water for the power rinse. The liquid fill continues as previously described until either the diaphragm switch 55 is closed, or the manually operable water-saver switch 75 is closed. As previously explained, closure of either switch functions to energize the main drive motor and terminate the water filling operation. Rinse agitation thus initiated continues for approximately 50° of cam rotation whereupon another pause period is enforced during which cam operated switches II, III, and IV are again reversed to call for drive of basket 1 at high speed for centrifugal extraction. This last spin period occurring from approximately 280° to 330° of cam rotation extracts the rinse water from the clothes leaving them in a damp-dry condition.

The final pause period commencing at approximately 330° of cam rotation terminates operation of the main drive motor as previously described. Timer motor 64 continues to run, however, until such time as cam V opens switch 86. It may be noted also that cam operated switch II remains in the up position although switches III and IV may be reversed to their agitate or down position prior to termination of the operation of the timer motor. With switch II in the up position and switch 86 in the down position at the end of the cycle of operations, the timer motor as well as the main drive motor is de-energized thus completing the operation of the machine. Obviously, knob 65 may be employed to rotate the cams through the off portion of the cycle from approximately 340° to 360° to again initiate the operation of the machine.

From the above description, it is seen that we have provided a control system for a clothes washer, capable of automatically terminating the filling operation responsive to the quantity of water admitted to the machine; or which selectively can be manually controlled by the operator to terminate the liquid filling operation at any time. Furthermore, by providing the normally open centrifugal switch on the motor in the liquid fill circuit, it is possible to employ a pump which is effective continuously whenever the main drive motor is functioning. The advantage of this construction lies especially in the fact that the outer tub is kept continuously empty and there is not a quantity of water remaining in the tub at the beginning of the spin portion of the cycle, at which time a large demand is placed on the pump. It is found as a matter of practice therefore that there is less difficulty with conditions such as "suds-lock," wherein the large volume of soapy sudsy water in the outer tub in contact with the walls of basket 1 prevents rotation of the basket at high speed for centrifugal extraction. This invention also has the added advantage of permitting the use of a standard two-way pump, which is effective upon either direction of rotation of drive motor 18. In accordance with previous constructions utilizing only the diaphragm operated switch, it was necessary to employ a pump which would function to discharge the water from the tub only during rotation of the motor in the spin direction since a quantity of water was required in the tub during rotation of the motor in the agitation direction.

While the present invention has been described by reference to a particular embodiment thereof, it is to be understood that numerous modifications may be made by those skilled in the art without actually departing from the spirit of the invention. Therefore, it is the aim of the appended claims to cover all such equivalent variations as come within the true scope of the invention.

What we claim as new and desire to secure by Letters Patent of the United States is:

1. In an automatic clothes washer or the like having a main drive motor, a control system comprising an electrically controlled valve for filling the machine with washing liquid, a liquid level responsive switch closed by a predetermined quantity of water in the machine, a manually operable water-saver switch, a centrifugal switch in said main drive motor closed when said motor is operating, means defining parallel electric circuits, including respectively said electrical valve control and said three switches, said main drive motor being in series circuit relation with said parallel circuits, and said electrically controlled valve being operable through said motor circuit until closure of any one of said three switches, whereupon said motor is energized.

2. In an automatic clothes washer having a main drive motor, an electrical control system comprising electrically controlled means for filling the machine with washing liquid, switch means closed by a predetermined quantity of water in the machine, a manually operable water-saver switch, centrifugal switch means closed upon rotation of said main drive motor, means defining parallel electric circuits including respectively said three switches, said main drive motor and said timer motor being in parallel circuit arrangement in turn in series with said parallel defining means including said three switches, and said electrically controlled liquid fill means being operable through said motor circuit until closure of any one of said three switches, whereupon said motor operates.

3. In a clothes washing machine of the type having a rotatable wash basket with washing means therein and a liquid containing tub surrounding the basket, an automatic control comprising a main drive motor for actuating said washing means and rotating said basket selectively dependent upon direction of motor rotation, a pump driven by said motor for emptying said tub and effective upon either direction of rotation, a pressure responsive switch in said tub, an electrical timer including a series of cams driven thereby, a bank of cam operated switches actuated by said timer driven cams to control the sequence of operations, electro-responsive liquid supply means to fill said basket, overflow from said basket into said tub actuating said pressure responsive switch to terminate the liquid supply and energize said timer and main drive motor, and a centrifugal switch in electrical parallel with said pressure responsive switch and operated to closed position upon rotation of said drive motor.

4. In a clothes washing machine of the type having a rotatable wash basket with washing means therein and a liquid containing tub surrounding the basket, an automatic electrical control system comprising a main drive motor for actuating said washing means and rotating said basket selectively dependent upon direction of motor rotation, a pump driven by said motor for emptying said tub and effective upon either direction of motor rotation, switch means responsive to the quantity of water admitted to said tub, a timer including a series of cams driven thereby, a bank of cam operated switches actuated by said timer driven cams to control the sequence of operations, electro-responsive supply means to fill said basket and to supply a quantity of liquid to said tub, a centrifugally actuated switch in electrical parallel with said pressure responsive switch and operated to closed position upon rotation of said drive motor, and a manually operable water-saver switch also electrically connected in parallel with said water operated switch to terminate the liquid supply and energize said timer and main drive motor.

5. In an automatic clothes washer or the like having a main drive motor, a control system comprising an electrically controlled valve for filling the machine with washing liquid, switch means for said valve, a centrifugal switch in said main drive motor closed when said motor is operating, means defining parallel electrical circuits including respectively said electrically controlled valve, said switch means, and said centrifugal switch, said main drive motor being in series circuit relation with said parallel circuits, and said electrically controlled valve being operable through said motor circuit until closure of any one of said switches, whereupon said motor is energized.

6. In an automatic clothes washer, electrically actuated liquid fill means, a driving motor, a centrifugal switch in said motor actuated from open to closed position when said motor is operating, the relative impedances of said liquid fill means and said motor being such that said liquid fill means may be actuated through said motor without causing motor operation, and switch means for said liquid fill means, said switch means and said centrifugal switch being electrically connected in parallel circuits along with a parallel circuit for said liquid fill means, said parallel being in series circuit relation with said motor.

7. In an automatic clothes washer, an electrically actuated liquid fill means, a driving motor, speed responsive switch means operated by said motor actuated from open to closed position when said motor is operating, the relative impedances of said liquid fill means and said motor being such that said liquid fill means may be actuated through said motor without causing operation of said motor, and switch means for terminating operation of said liquid fill means, said switch means and said speed responsive switch being in electrical parallel and in series circuit relationship with said motor, whereby closure of either switch terminates fill and commences motor operation.

8. In a clothes washing machine of the type having a rotatable wash basket with washing means therein and a liquid containing tub surrounding the basket, an automatic control comprising a main drive motor for actuating said washing means and rotating said basket selectively dependent upon direction of motor rotation, a pump driven by said motor for emptying said tub and effective upon either direction of rotation, switch means responsive to the quantity of liquid in the machine, an electrical timer including a sequence control driven thereby, said sequence control including a plurality of switches controlling operation of said machine, electro-responsive liquid supply means to fill said basket, said liquid responsive switch means terminating liquid supply and energizing said timer and main drive motor, and a centrifugal switch in electrical parallel with said liquid sensing switch operated to closed position upon rotation of said drive motor.

9. An automatic clothes washer or the like having a washing chamber, washing means for said chamber, a motor for operating said washing means, water fill control valve means for said chamber, water level control means responsive to a predetermined liquid level in said chamber including a switch controlling said valve means to shut off the water supply, control means for said motor to effect its operation to operate said washing means including said switch to start said motor upon the attainment of said liquid level, and switch means operated by said motor when said motor starts to maintain its operation regardless of subsequent operation of said switch.

10. An automatic clothes washer or the like having a washing chamber, washing means for said chamber, a motor for operating said washing means, water fill control valve means for said chamber, water level control means responsive to a predetermined liquid level in said chamber including a switch controlling said valve means to shut off the water supply, a manually operable switch to control the operation of said water supply means to shut off the water supply independently of said first named switch whereby the liquid level in said washing chamber can be controlled at will at any level up to the level established by said water level responsive control means, and control means for said motor to effect its operation to operate said washing means controlled selectively by said first named switch or said manually operable switch to start said motor, and switch means closed by said motor when started to maintain motor operation regardless of the subsequent operation to open positions of said first named switch and said manually operable switch.

References Cited in the file of this patent
UNITED STATES PATENTS

| | | |
|---|---|---|
| 2,654,239 | Welch et al. | Oct. 6, 1953 |
| 2,662,384 | Morrison et al. | Dec. 15, 1953 |